United States Patent
Briggs et al.

(10) Patent No.: US 9,822,919 B2
(45) Date of Patent: Nov. 21, 2017

(54) THERMAL INSULATION INCLUDING A CELLULAR MATRIX

(71) Applicant: Lockheed Martin Corporation, Bethesda, MD (US)

(72) Inventors: David C. Briggs, Edgewood, MD (US); Corey A. Fleischer, Abingdon, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 195 days.

(21) Appl. No.: 14/611,039

(22) Filed: Jan. 30, 2015

(65) Prior Publication Data
US 2015/0219268 A1    Aug. 6, 2015

Related U.S. Application Data

(60) Provisional application No. 61/934,686, filed on Jan. 31, 2014.

(51) Int. Cl.
*F16L 59/02*    (2006.01)
*B32B 5/24*    (2006.01)
(Continued)

(52) U.S. Cl.
CPC ............ *F16L 59/026* (2013.01); *B32B 5/024* (2013.01); *B32B 5/245* (2013.01); *B32B 7/02* (2013.01);
(Continued)

(58) Field of Classification Search
None
See application file for complete search history.

(56) References Cited

U.S. PATENT DOCUMENTS

| 4,777,086 A * | 10/1988 | Madden ................. B32B 15/14 |
| | | 428/432 |
| 4,865,784 A * | 9/1989 | Hill ........................ B29C 44/04 |
| | | 428/314.4 |

(Continued)

FOREIGN PATENT DOCUMENTS

| EP | 2277691 A1 | 1/2011 |
| WO | WO 2013/148843 A2 | 10/2013 |

OTHER PUBLICATIONS

Cryogel Z Product Data Sheet. High Performance, Flexible, Industrial Insulation for Sum-Ambient and Cryogenic Applications. 2014. 2 pages.

(Continued)

*Primary Examiner* — David Sample
*Assistant Examiner* — Nicholas W Jordan
(74) *Attorney, Agent, or Firm* — Wolf, Greenfield & Sacks, P.C.

(57) ABSTRACT

According to some aspects, a thermal insulation material is provided, comprising a first insulation layer having a cellular structure, wherein cells of the cellular structure comprise an inorganic insulator in a powder form and a second insulation layer comprising inorganic fibers. According to some aspects, a fire protection thermal insulation system is provided, comprising a first insulation layer having a cellular structure, wherein cells of the cellular structure comprise an inorganic insulator in a powder form, the first insulation layer on a fire facing side of the thermal insulation system, and a second insulation layer comprising inorganic fibers, the second insulation layer on a non-fire facing side of the thermal insulation system.

17 Claims, 7 Drawing Sheets

(51) Int. Cl.
*B32B 5/02* (2006.01)
*B32B 7/02* (2006.01)
*B63B 3/68* (2006.01)

(52) U.S. Cl.
CPC .......... *B63B 3/68* (2013.01); *B32B 2262/101* (2013.01); *B32B 2262/108* (2013.01); *B32B 2266/0214* (2013.01); *B32B 2307/304* (2013.01); *B32B 2307/3065* (2013.01); *B32B 2605/00* (2013.01); *B32B 2605/12* (2013.01); *Y10T 29/49826* (2015.01); *Y10T 428/2495* (2015.01); *Y10T 428/249981* (2015.04); *Y10T 428/249994* (2015.04); *Y10T 442/3325* (2015.04)

(56) References Cited

U.S. PATENT DOCUMENTS

| | | | |
|---|---|---|---|
| 4,921,745 A * | 5/1990 | Mitsui | B32B 3/12 428/118 |
| 6,045,718 A * | 4/2000 | Holman | E04B 1/94 428/315.5 |
| 6,635,202 B1 * | 10/2003 | Bugg | B29C 44/186 52/745.19 |
| 8,663,774 B2 | 3/2014 | Fernando et al. | |
| 2006/0035054 A1 | 2/2006 | Stepanian et al. | |
| 2009/0209155 A1 | 8/2009 | Goulet | |
| 2012/0048451 A1 * | 3/2012 | Carlson | B32B 3/12 156/83 |
| 2012/0107547 A1 | 5/2012 | Fernando et al. | |
| 2014/0287641 A1 | 9/2014 | Steiner, III | |
| 2014/0356571 A1 * | 12/2014 | Watanabe | B32B 3/12 428/117 |
| 2015/0219269 A1 | 8/2015 | Fleischer et al. | |

OTHER PUBLICATIONS

Health Information Cabot Nanogel Aerogel Products. Feb. 2007. 2 pages.

Hurwitz et al., Tailoring of Boehmite-Derived Aluminosilicate Aerogel Structure and Properties: Influence of Ti Addition. Materials Research Society Proceedings. 2011; (1306): 6 pages.

Insulation Fabricators, Inc.: Aspen Aerogels: Pyrogel XTF. 2014. 1 page.

* cited by examiner

THERMAL INSULATION INCLUDING A CELLULAR MATRIX

CROSS-REFERENCE TO RELATED APPLICATIONS

The present application claims the benefit under 35 U.S.C. §119(e) of U.S. Provisional Patent Application No. 61/934,686, filed Jan. 31, 2014, titled "Cellular Matrix-Enclosed Fumed Silica Wrap," which is hereby incorporated by reference in its entirety.

BACKGROUND

Passive fire protection is often provided in buildings, vehicles and marine vessels by the use of mineral wool. Mineral wool (also sometimes referred to as mineral fiber, stone wool, alkali earth, man-made mineral fiber or man-made vitreous fiber) is a fiber material formed by spinning and/or drawing molten minerals (or so-called "synthetic minerals" such as slag or ceramics). Mineral wool is frequently used because it has the characteristics of flexibility and durability at high temperatures, while retaining thermal insulation properties. Mineral wool insulation is often made and installed in a layer having a thickness that is determined based on desired thermal insulation properties.

SUMMARY

This invention relates to high-temperature passive thermal insulation, specifically, thermally-insulating flexible blankets.

According to some aspects, a thermal insulation material is provided, comprising a first insulation layer having a cellular structure, wherein cells of the cellular structure comprise an inorganic insulator in a powder form, and a second insulation layer comprising inorganic fibers.

According to some aspects, a fire protection thermal insulation system is provided, comprising a first insulation layer having a cellular structure, wherein cells of the cellular structure comprise an inorganic insulator in a powder form, the first insulation layer on a fire facing side of the thermal insulation system, and a second insulation layer comprising inorganic fibers, the second insulation layer on a non-fire facing side of the thermal insulation system.

According to some aspects, a method of providing fire insulation within an marine vessel is provided, the method comprising attaching a thermal insulation material to one or more structures of the marine vessel, wherein the thermal insulation material comprises a first insulation layer having a cellular structure, wherein cells of the cellular structure comprise an inorganic insulator in a powder form, the first insulation layer on a side of the thermal insulation material distal to the one or more structures, and a second insulation layer comprising inorganic fibers, the second insulation layer on a side of the thermal insulation material proximal to the one or more structures.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

DETAILED DESCRIPTION

Figure 1:
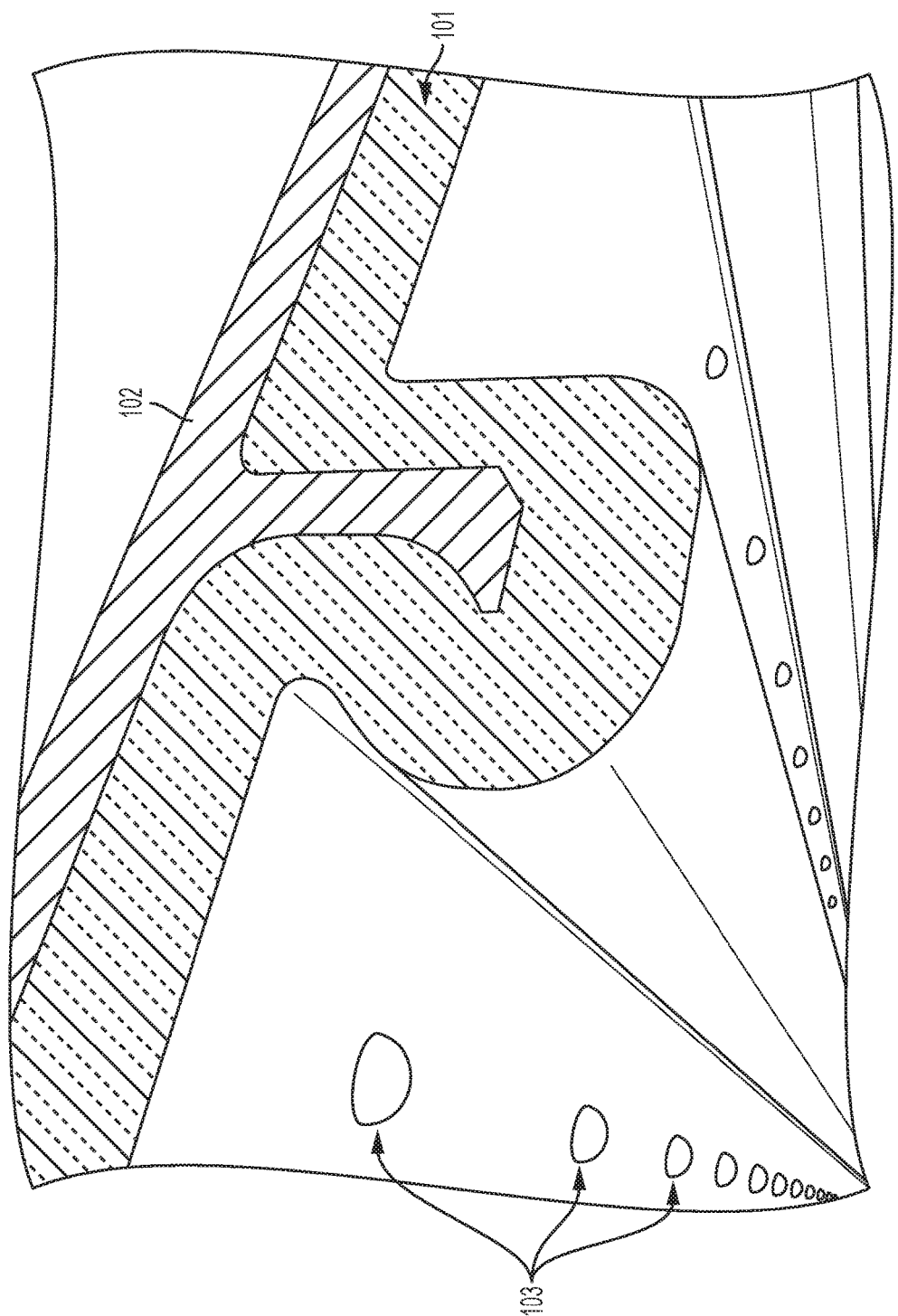
FIG. 1 is a photograph of mineral wool batting installed upon the steel hull of a vessel.

In the event of a fire, one side of fire protection insulation is typically facing, or in proximity to, the heat of the fire. This results in a temperature gradient across the insulation where the temperature is at, or close to, that of the fire on one side of the insulation and a lower temperature on the other side of the insulation. The more effective the insulation, the lower the temperature on the non-facing or non-fire proximate side of the insulation. If the temperature on the non-fire facing side of the insulation is sufficiently high, damage to a structure or other object may result from the heat of the fire propagating through the insulation. For a hydrocarbon fire, temperatures to which the insulation is exposed can rise up to 1000° C. on the side facing, or in proximity to, the fire, but the desired temperature on the opposing side (i.e., that which would avoid or mitigate structural damage) may be much lower, such as around 100-200° C.

Passive fire insulation, such as in walls or other structures, may be provided using one or more layers of mineral wool or mineral fiber batting (sometimes referred to as "blankets"). Mineral wool blanket insulation is often used for its high temperature resistance, flexible product form, and non-toxic qualities, as well as its low cost. U.S. Navy vessels utilize fire protection insulation so as to be conformant with the organization's MIL-PRF-32161 high temperature fire protection specification, which are typically met by multiple layers of mineral wool. Ordinarily, such fiber batting is installed throughout a vessel to protect the vessel against damage from fires.

Generally speaking, there are two types of fires that a fire boundary within a marine vessel may be designed to stop. One is a hydrocarbon pool fire, which is characterized by a rapid temperature rise to around 1100° C., and a second is a cellulose fire, characterized by a rapid temperature rise to around 500° C., followed by a comparatively slow temperature rise to 1100° C. A majority of fire boundary insulations use mineral wool due to good performance at a reasonable cost, especially at lower temperatures. At the higher temperatures of a hydrocarbon pool fire, mineral wool is less efficient than at lower temperature due to its structure's relatively large mean free path, which allows air molecules to convect heat at these temperatures. Typically, twice the thickness of mineral wool is required to meet fire boundary requirements for a hydrocarbon pool fire versus a cellulose fire. In a large Navy combatant vessel, where there are many fire boundaries for which regulations require resistance to hydrocarbon pool fires, there is typically over 100 tons of fire boundary insulation. There is therefore a significant weight savings opportunity if fire boundary insulation could affordably be made more efficient at insulating against a high temperature hydrocarbon pool fire, since this might reduce the total weight of the fire boundary insulation necessary to protect against such fires.

FIG. 1 is an illustration of mineral wool batting installed within the steel hull of a Naval vessel. FIG. 1 illustrates a cross-section through the hull of the vessel, depicting mineral wool insulation 101 through a section of the vessel. In the example of FIG. 1, insulation 101 comprises several layers of mineral wool batting that together have a combined thickness of several inches. The insulation 101 is wrapped around a steel beam 102 and attached via pins 103. The insulation 101 includes a surface layer, such as fiberglass cloth (not labeled), that prevents people or objects that might come into contact with the insulation from causing abrasion of the mineral wool, and to provide containment of the mineral wool.

Figure 2:
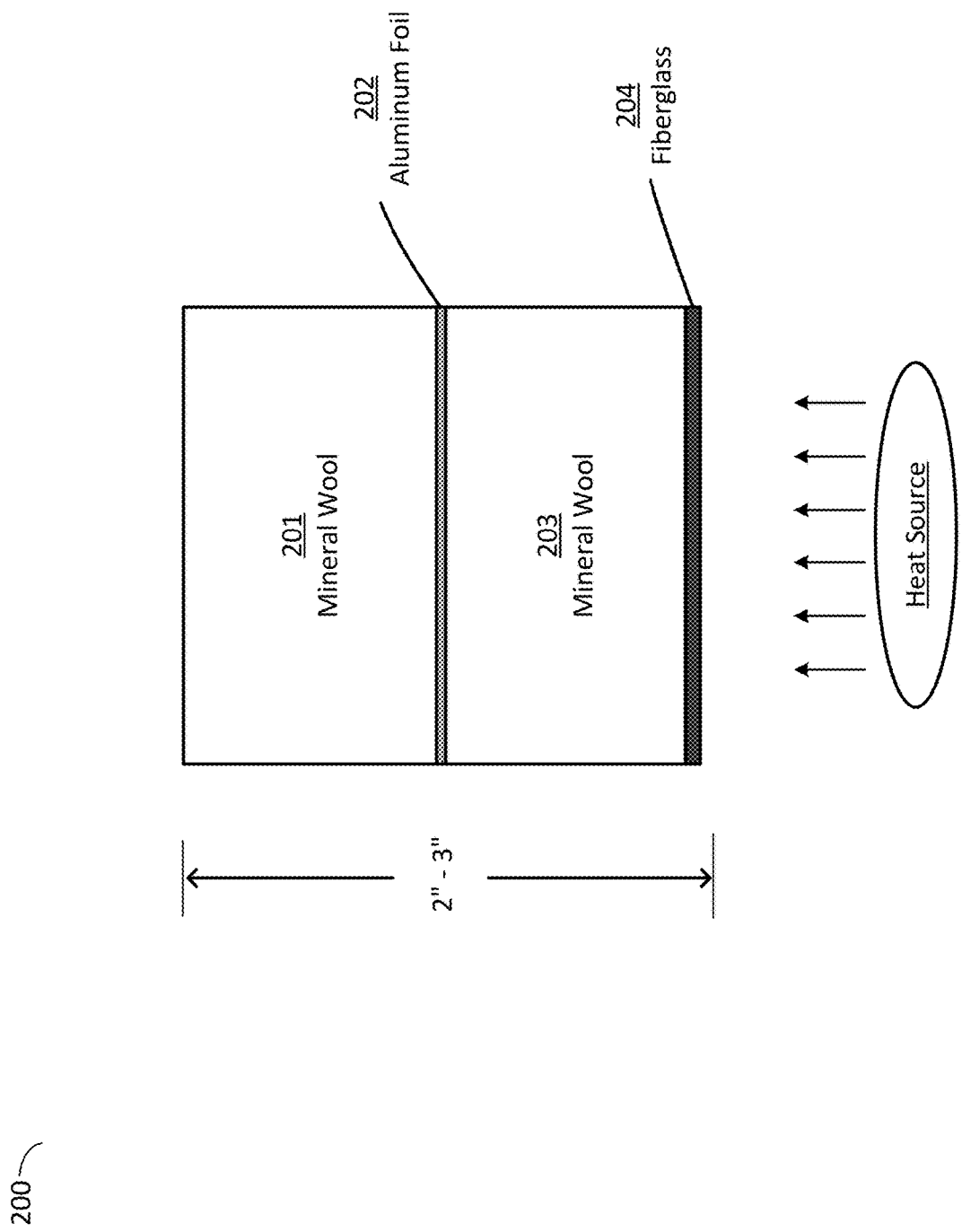
FIG. 2 is a cross-sectional view of fire protection insulation made from mineral wool.

FIG. 2 is a cross-sectional view of a thermal insulation solution 200 that comprises multiple layers of mineral wool. Two equally thick layers of mineral wool 201 and 203 are separated by a layer of aluminum foil 202, which provides infrared reflectivity to reflect heat that is transmitted from the heat source through mineral wool layer 203. Typically the mineral wool has a density on the order of 6 to 8 lb/ft$^3$. On the side of the insulation facing the heat source, a thin layer of fiberglass cloth 204 (e.g., E-glass) is deployed to provide containment of the mineral wool layer 203. The combined thickness of mineral wool that is needed to provide the necessary fire protection (e.g., the MIL-PRF-32161 specification in a U.S. Naval vessel) is between 2" and 3", which depends on the type of application. For example, to meet the MIL-PRF-32161 fire protection specification, the insulation solution 200 has a thickness of roughly 2" when used for steel structure protection, and a thickness of 3" when used for aluminum structure protection.

The inventors have recognized and appreciated that, particularly on marine vessels where space and weight are at a premium, it is desirable to reduce bulk and weight of fire protection insulation. For example, on a U.S. Navy 3,500 metric ton vessel, there may be over 60 metric tons of mineral wool blanket insulation present on board. While mineral wool blanket insulation is low cost and flexible, it also therefore represents a substantial weight component of a vessel, which may reduce the vessel's performance (e.g., the vessel's speed and range). The inventors have recognized and appreciated that a lightweight, thin insulation solution may provide a substantial performance increase for a vessel by reducing the amount of weight needed for fire protection insulation while still meeting fire protection goals (e.g., the MIL-PRF-32161 specification).

While some materials that provide greater fire protection than mineral wool are available, they are also significantly more costly than mineral wool and generally more difficult to work with during installation into a marine vessel. However, the inventors have recognized and appreciated that an effective fire insulation may be formed by combining two different insulating materials that together produce an effective fire protection temperature gradient while simultaneously reducing bulk and weight of the insulation. The temperature gradient across a layer of material depends upon the temperature at both sides of the layer and on the material's thermal conductivity (which generally changes significantly as a function of temperature). The inventors have recognized that providing material with a low thermal conductivity on a fire facing side of the insulation reduces the need for a material with such a low thermal conductivity on a non-fire facing side of the insulation. Generally, thermal conductivity increases with increasing temperature. However, different materials generally have thermal conductivities that increase at different rates. This means that the difference between the thermal conductivities of two different materials generally becomes larger as temperature increases. As an example, FIG. 3 qualitatively illustrates the thermal conductivity of two materials, mineral wool and amorphous silica, as a function of temperature. As shown, the difference in thermal conductivities of the two materials becomes smaller as the temperature decreases.

Figure 3:
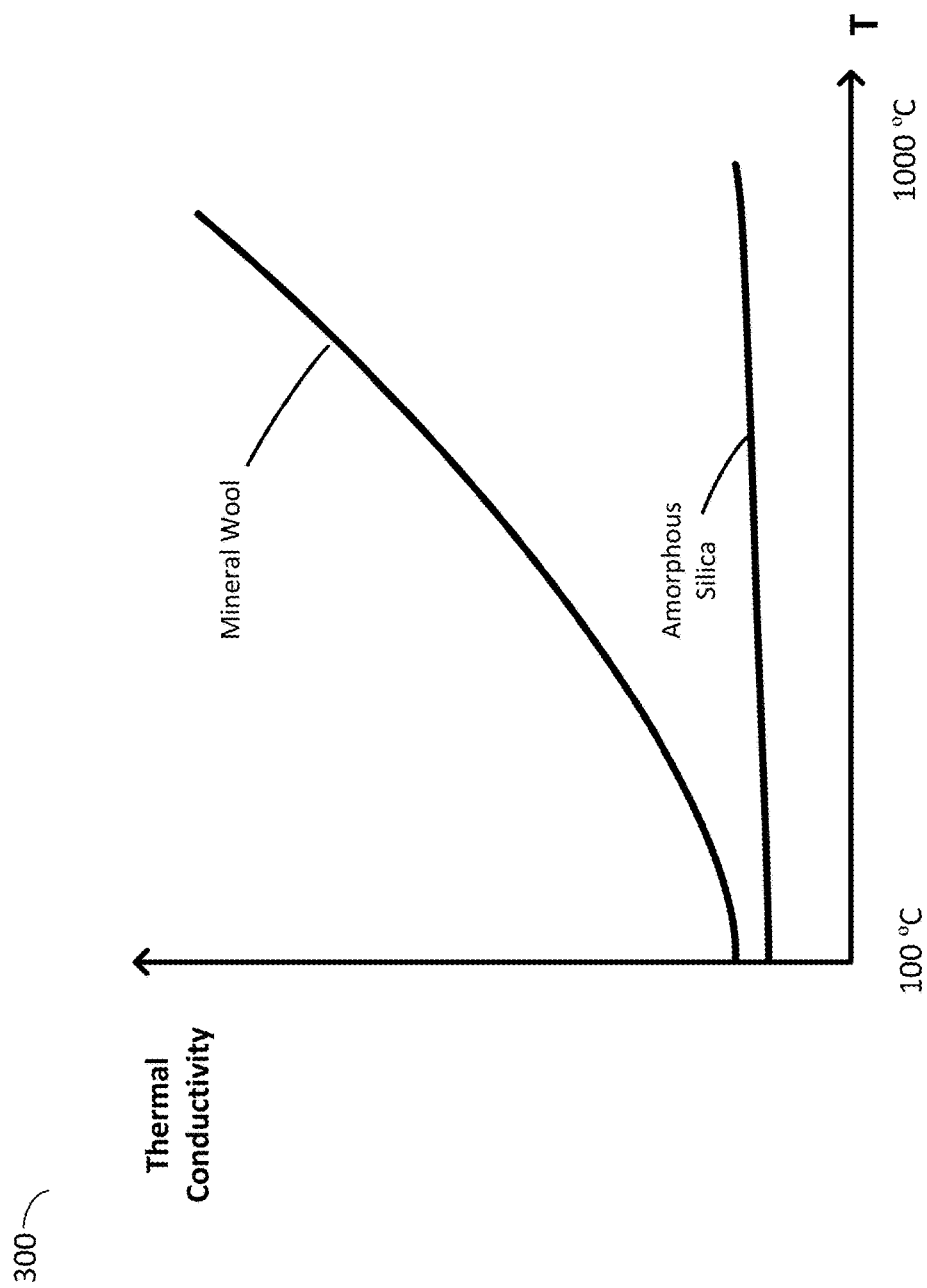
FIG. 3 is an illustrative chart depicting the thermal conductivity of two materials as a function of temperature, according to some embodiments.

The inventors have appreciated that, since a layer of a first material having a low thermal conductivity (e.g., amorphous silica) may reduce the temperature substantially across its thickness (e.g., from 1000° C. to 500° C.), this may reduce the temperature such that the difference in thermal conductivities of the first material and a second material at this reduced temperature may be less than the difference in their thermal conductivities at the higher, exterior temperature. Thus, the second material may become a suitable choice for the remainder of the insulation, especially if it is less costly than the first material. In the example of FIG. 3, for instance, a layer of amorphous silica may be used to reduce the temperature from 1000° C. to 500° C., at which point the thermal conductivities of the amorphous silica and mineral wool are more similar than they were at 1000° C. Accordingly, a remainder of the insulation may be made from a layer of mineral wool, which will provide comparable performance to using pure amorphous silica, yet may provide other benefits such as reduced cost and/or increase ease of production. Therefore, while the second (non-fire facing) material may be less effective at fire insulation per unit weight and/or volume than the first (fire facing) material, by using the first material to reduce the temperature part-way from the initial (e.g., fire) temperature to the desired temperature, the second material may nevertheless be a suitable choice to maximize the cost versus benefit of the insulation because at the reduced temperature the difference in fire insulation effectiveness between the two materials may be far less than the difference in fire insulation effectiveness at the initial temperature.

The inventors have recognized that fumed silica is a particularly good candidate for use as a fire facing layer of fire protection insulation because of its thermal insulation properties, which typically includes an 8-9× lower thermal conductivity at high temperatures. Fumed silica is an inexpensive form of silicon dioxide (silica) that comprises microscopic droplets of amorphous silica that have been fused into three-dimensional particles. The resulting powder may be packed into a confined volume, thereby forming micrometer-sized pores between and/or within particles through which the flow of air is inhibited, resulting in a low thermal conductivity.

According to some embodiments, a layer comprising fumed silica may be combined with a layer of mineral wool to form fire protection insulation that has a reduced bulk and weight compared to a monolithic mineral wool insulation yet having commensurate fire protection properties. In particular, by configuring the insulation such that the fumed silica layer faces a heat source, the temperature gradient across that layer may be such that the layer of mineral wool, which does not face the heat source, experiences a lower temperature at which its thermal conductivity is more similar to that of the fumed silica. While fumed silica generally has lower thermal conductivity than a mineral wool and is lighter, it is also more costly to package and install. However, the inventors have recognized that by combining suitable thicknesses of a fumed silica layer with an inorganic fiber layer, such as mineral wool, fire insulation may be produced that is almost as light as a pure fumed silica insulation having the same fire insulation effectiveness, yet is less costly to produce.

Fumed silica powder has a tendency to flow like sand or clay at room temperature. The inventors have therefore recognized and appreciated that even sealed insulating panels containing fumed silica may have a problem that a single puncture of the panel can result in leakage of a substantial amount of the fumed silica contained within. The inventors have therefore appreciated that, when using fumed silica to provide thermal insulation, it may be necessary to create individually-sealed or quilted panels that contain the fumed silica within a defined volume. In particular, cells containing fumed silica may be arranged in a cellular matrix, providing a layer of insulation that contains fumed silica, yet resists outflow of fumed silica to a region of the structure that has been damaged, such that undamaged regions retain fumed silica and retain their thermal insulation properties.

According to some embodiments, a fire insulation material may comprise a layer of fumed silica arranged in cells having a honeycomb configuration, such that the cells are hexagonal in shape. Each of the hexagonal cells may be filled, or substantially filled, with fumed silica. The cellular layer may be combined with any number of layers of other insulating materials, such as a layer of mineral wool to provide a low-cost yet effective thermal insulation system, as discussed above.

According to some embodiments, a fire insulation material may comprise a layer of fumed silica arranged in cells which are closely packed but disconnected from each other on one or more faces, which may for example enable flexibility. The packaging configuration commonly known as "bubble wrap" is one example of such a configuration. In some use cases, the "bubbles" of a bubble wrap configuration may be sized such that gaps between cells are closed by individual bubbles pushing against each other. Additionally, or alternatively, multiple thin layers of bubble wrap may be used such that gaps between cells are not aligned between layers, thus mitigating or removing the chance of a full thermal short circuit existing through the layer.

According to some embodiments, a cellular matrix may be formed from a high temperature-resistant plastic such as polyimide and/or polyether ether ketone (PEEK). Such materials may provide a flexible material that does not melt at high temperatures (e.g., above 500° C.), and that also provides thermal insulation properties. Use of a metallic material to form the structure of the cellular matrix may be undesirable in that the metallic cellular matrix may effectively conduct heat through the insulation layer. It is therefore desirable to form the cellular matrix (into whose cells fumed silica may be provided) from a material having high heat resistance and low thermal conductivity. Other materials resistant to heat may also be used, such as woven or stitch bonded fiberglass and/or quartz cloth.

According to some embodiments, a cellular matrix may be sealed using a material from which the cellular matrix structure is formed. For example, a top layer of the cellular matrix in addition to the cellular matrix structure may be formed from polyimide. Sealing of a cellular matrix layer may alternatively or additionally be achieved by adhering the cellular matrix to other structural elements of the insulation, such as a layer of aluminum foil. In some embodiments, multiple cellular matrix layers may be used within an insulation material to increase the thickness of the insulation without increasing an amount of fumed silica that may leak from a single damaged cell.

According to some embodiments, one or more reflectors may be provided between any number of material layers of a fire insulation material, including the exterior surface of the material. Heat is transferred by conduction, by convection, and/or by radiation. While the materials of a cellular matrix (e.g., polyimide and fumed silica) may inhibit heat transfer via conduction and/or convection, heat may nonetheless be transferred through the insulator by radiation. According to some embodiments, radiative heat transfer may be prevented or limited by adding an reflector, such as a layer of foil or a layer comprising $TiO_2$, to reflect radiative heat passing through one or more layers of the insulation. In some cases, multiple reflector layers may be included between any layers (e.g., multiple reflector layers may be stacked between two insulator layers and/or reflector layers may be located between multiple pairs of adjacent layers) and/or at a surface of the insulator.

According to some embodiments, more than two layers of insulating material may be used in fire insulation. Three or more layers could be used, in some embodiments, which may include a layer of fumed silica in a cellular matrix, a layer of an inorganic fiber (e.g., mineral wool), a layer of an aerogel, and/or a layer of polyimide foam. Additional layers and materials of those layers may be selected on the basis of their functional properties. As discussed above, a functional temperature gradient may be established by ordering the layers such that the material with lower thermal conductivity at high temperatures is nearer the source of heat. According to some embodiments, multiple layers having a cellular matrix form, where each layer's filler material has a different pore size, may be used in fire insulation, such as by arranging those layers to have increasing pore size with increasing distance from the fire facing side of the insulation. Such layers may comprise the same or different materials.

According to some embodiments, a fire insulation may comprise multiple crimped layers in conjunction with a layer having a cellular matrix form. The crimped layers may improve heat reflectivity and may increase the bending capability of the cellular matrix layer. In some cases, the crimped layers may include aluminum separators.

Following below are more detailed descriptions of various concepts related to, and embodiments of, thermal insulation that includes two different insulating materials that together provide an effective fire protection temperature gradient while reducing bulk and weight of the insulation. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

Figure 4:
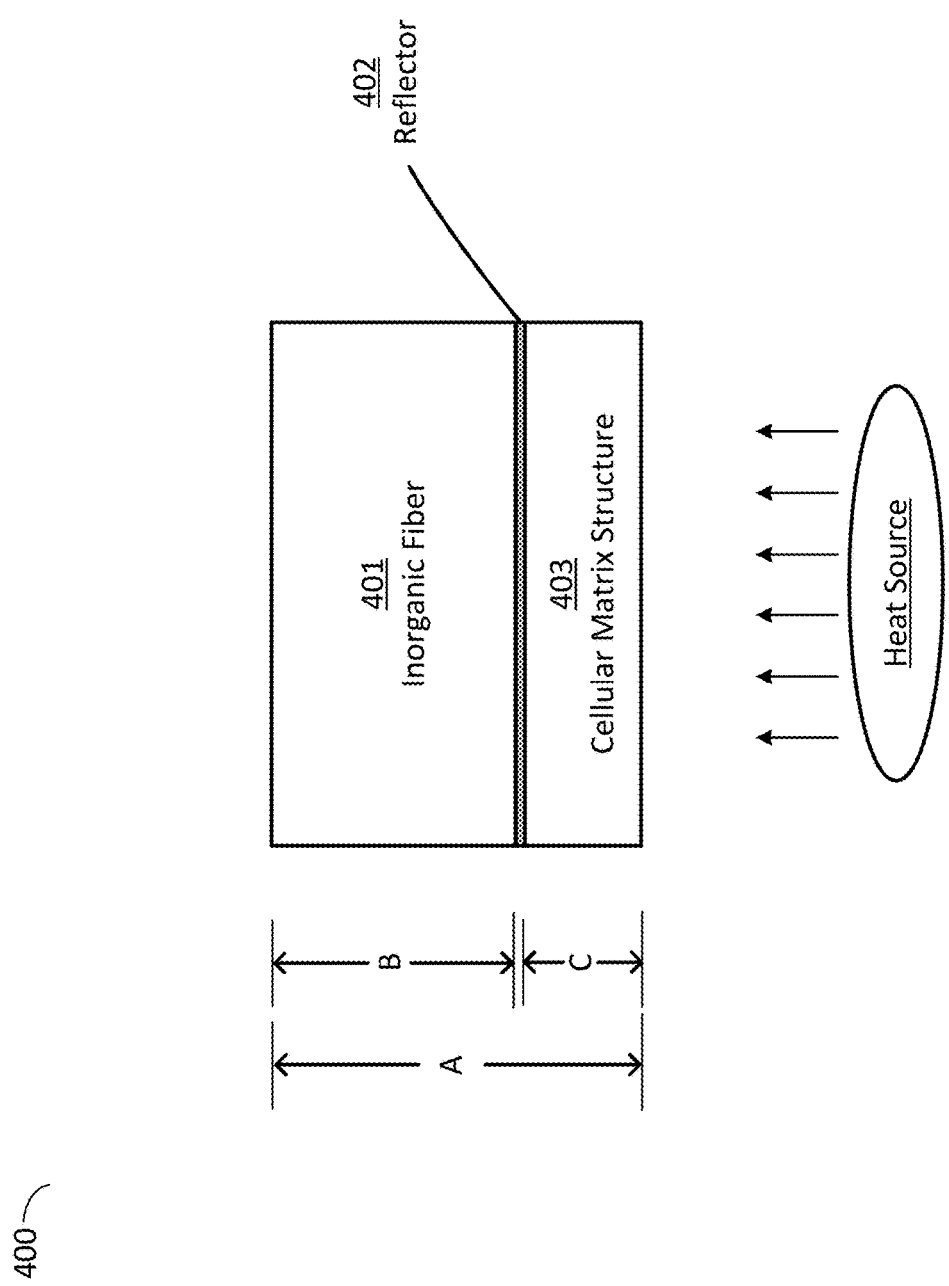
FIG. 4 is a cross-sectional view of fire protection insulation, according to some embodiments.

FIG. 4 is a cross-sectional view of thermal insulation, in accordance with some embodiments. Insulation 400 includes a layer of inorganic fibers 401 and a layer having a cellular matrix structure 403 in addition to reflector 402 between the two layers. As discussed above, such a configuration may provide fire protection commensurate with the thermal insulation solution 200 shown in FIG. 2 yet having a reduced weight and thickness.

Inorganic fiber 401 may comprise mineral wool or any other suitable layer of inorganic fibers. In the example of FIG. 4, the thickness B of layer 401 may be between 0.5" and 1.5", though more preferably is between 0.6" and 1", such as 0.75". Cellular matrix layer 403 may comprise any suitable material or materials formed into a cellular matrix.

As discussed above, such a layer may comprise fumed silica formed into a matrix, wherein the cellular matrix has walls formed from a polyimide. However, layer 403 may include a cellular matrix having any suitable form, including any regular tiling form (e.g., hexagonal, squares, etc.) any semi-regular tiling form (e.g., truncated square tiling, etc.), any irregular tiling form, or combinations thereof. Not all cells of the cellular matrix are necessarily filled with a solid insulating material such as fumed silica, and in some use cases one or more cells may be filled with air or another gas. Cells of the cellular matrix may have any suitable size, such as a diameter between 0.25" and 1".

The thickness C of cellular matrix layer 403 in the example of FIG. 4 may be between 0.1" and 1", though more preferably is between 0.2" and 0.7", or between 0.3" and 0.5", such as 0.375". Reflector layer 402 includes any suitable layer that provides reflection of radiation incident from the side of the reflector facing the heat source, and may have any suitable thickness. According to some embodiments, reflector layer 402 comprises one or more layers of aluminum foil having a total thickness of less than 0.1". The total thickness of the insulation A may be between 0.75" and 2", such as between 0.8" and 1.5", such as between 0.9" and 1.2", or such as 1.15".

In some cases, a thin layer may be provided on the side of the cellular matrix layer facing toward the heat source to provide structural containment and/or abrasion resistance. Such a layer may comprise, for example, quartz cloth and/or fiberglass. Quartz cloth has a higher melting point than fiberglass, but provides containment commensurate to that of a fiberglass cloth. In some cases, an additional reflector layer may be placed between the cellular matrix layer 403 and a containment layer. As discussed above, in general any number of reflector layers may be used in a fire insulation as described herein.

According to some embodiments, a hybrid cloth that includes both quartz yarn and fiberglass yarn may be employed as a surface fire facing layer. Such a hybrid may provide a higher pre-fire breaking strength and a lower post-fire breaking strength than a pure fiberglass cloth surface layer, yet may have a cost that is commensurate with a pure fiberglass cloth. In some use cases, such a hybrid cloth may include more fiberglass fibers than quartz fibers. In some use cases, a hybrid cloth may include fiberglass yarn, quartz yarn and one or more additional inorganic yarns. Irrespective of the content of a cloth surface layer, the cloth layer may be configured to be a three-dimensional weave that encapsulates all or part of the cellular matrix layer.

In some use cases, insulation 400 may have a combined thickness A of 1.15", which is significantly less than the 2"-3" necessary to produce commensurate fire insulation properties with the use of mineral wool alone, as shown in FIG. 2 and discussed above. In such a use case, temperature insulation may be improved by approximately 8× at high temperatures (e.g., above 500° C.), and at 1-2× at lower temperatures (e.g., below 500° C.) while additionally having a weight that is 50-90% that of the mineral wool insulation shown in FIG. 2. For example, a 0.375" thick layer of fumed silica arranged in a cellular matrix combined with a 0.75" thick layer of mineral wool insulation has been tested at the screening level in accordance with Design Data Sheet, DDS 078-1, Composite Material, Surface Ships, Topside Structural and Other Topside Applications—Fire Performance Requirements, B.2.2, Small-Scale Testing for Fire Resistance and MIL-STD-3020, Fire Resistance of U.S. Naval Surface Ships. This solution is expected to pass full-scale testing in accordance with MIL-STD-3020 to meet the fire insulation requirements of MIL-PRF-32161.

A combination of fumed silica arranged in a cellular matrix and mineral wool, tested in a thickness that is expected to meet the MIL-STD-3020 fire resistance test in accordance with MIL-PRF-32161, provided a 23% weight savings and outperformed the insulation characteristics of the baseline mineral wool-only insulation. Such a weight advantage would result in a savings of many metric tons of weight for even a small naval vessel, providing an increase in performance and maneuverability.

Figure 5:
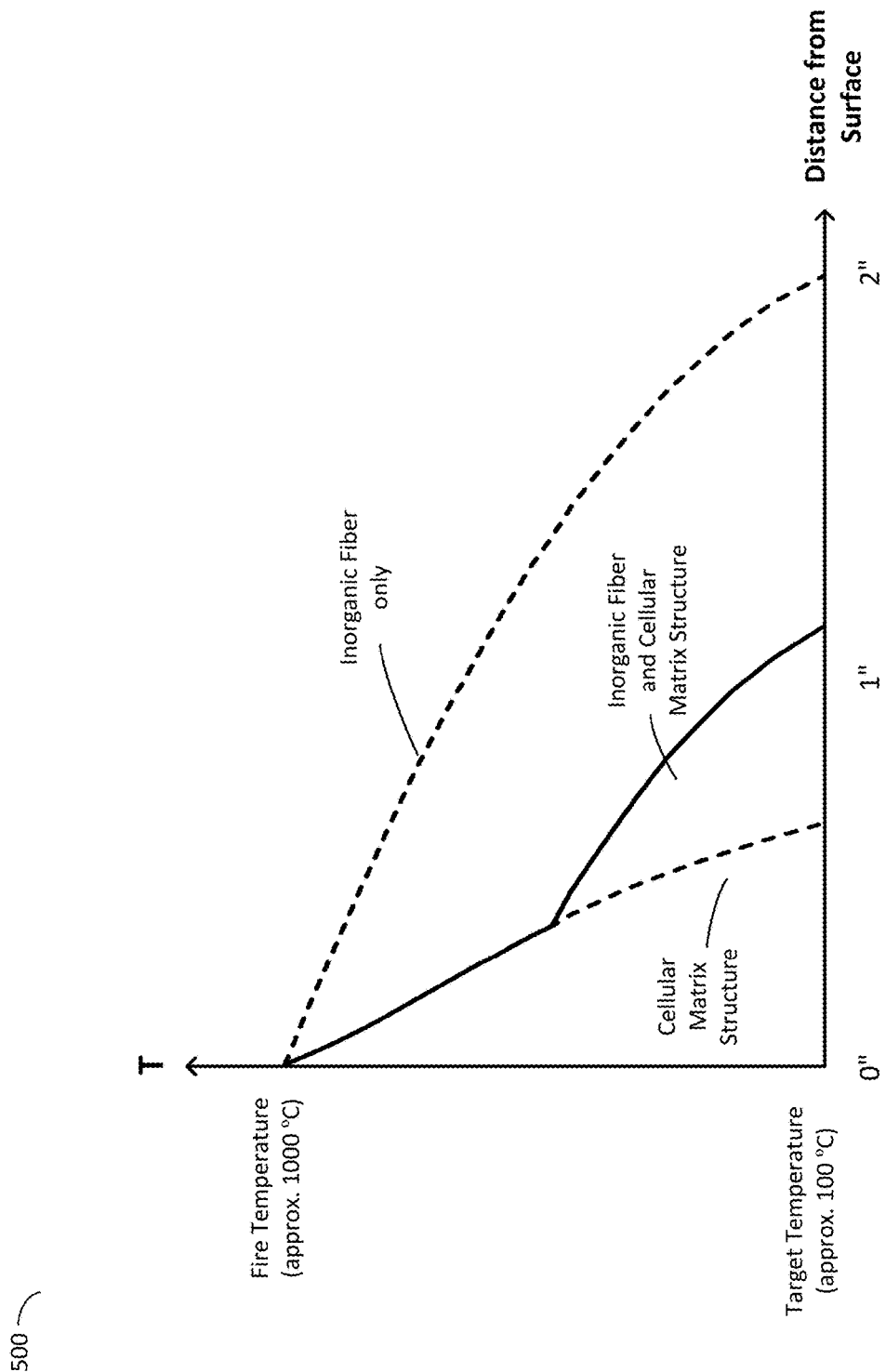
FIG. 5 is a chart depicting temperature gradients of three illustrative fire insulation systems, according to some embodiments.

FIG. 5 depicts a graph of illustrative temperature gradients within an inorganic fiber, a cellular matrix structure, and an illustrative "combination" insulating material that includes a fire facing layer of a cellular matrix structure in addition to a layer of inorganic fiber (e.g., as shown in FIG. 4). As discussed above, while a combination insulating material may have a thickness that is much less than that of the inorganic fiber insulation, it may have a cost that is similar to that of the inorganic fiber but much less costly than the cellular matrix insulation while weighing substantially less than the inorganic fiber. FIG. 5 is provided merely to illustrate one possible temperature gradient that may be produced by combining a cellular matrix structure with an inorganic fiber, and should not be viewed as limiting the form of the temperature gradient that may be formed by arranging any number of layers of inorganic fiber, layers having a cellular matrix structure and/or other materials, in any suitable thicknesses, as discussed herein.

In the example of FIG. 5, a cellular matrix-only insulation provides suitable fire insulation to reduce temperatures from a fire temperature of approximately 1000° C. to a target temperature of approximately 100° C. over a thickness of approximately 0.7". In contrast, an inorganic fiber insulation reduces temperatures from a fire temperature of approximately 1000° C. to a target temperature of approximately 100° C. over a thickness of approximately 2". An combined inorganic fiber and cellular matrix insulation, however, reduces temperatures from a fire temperature of approximately 1000° C. to a target temperature of approximately 100° C. over a thickness of approximately 1.1", which comprises a 0.4" layer of a cellular matrix and a 0.7" layer of inorganic fiber, the cellular matrix layer being fire-facing.

Accordingly, the combined insulation may have a weight substantially less than that of the inorganic fiber only insulation, yet may cost a commensurate amount or may have a cost that represents only a modest increase over the inorganic fiber insulation (e.g., the cost of 0.3" of a cellular matrix layer and 0.7" of inorganic fiber versus the cost of 2" of inorganic fiber).

Figure 6B:
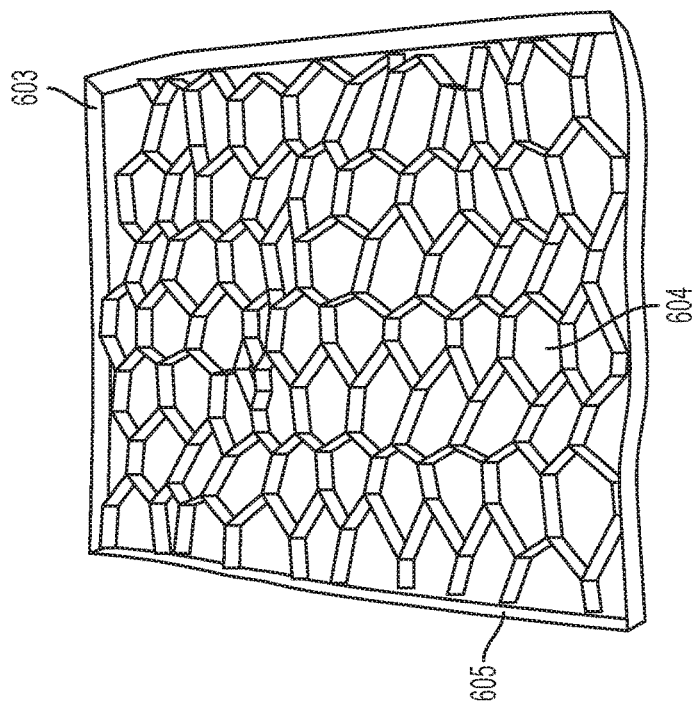
FIGS. 6A-D depict an illustrative process of forming a thermally-insulating blanket, according to some embodiments.
Figure 6A:
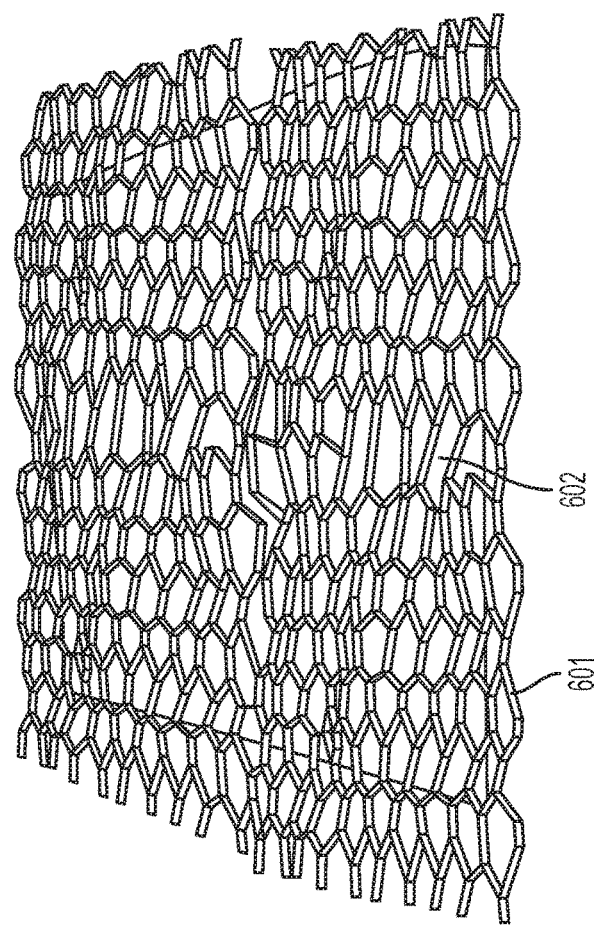

FIGS. 6A-D depict an illustrative process of forming a thermally-insulating blanket, according to some embodiments. FIG. 6A depicts a first stage of manufacture of a thermally-insulating blanket in accordance with some embodiments. In the depicted stage of manufacture, a polyimide cellular matrix 601 has been constructed and positioned atop a section of thermal insulation blanket, of which aluminum foil layer 602 is visible.

FIG. 6B depicts a second stage of manufacture of a thermally-insulating blanket in accordance with some embodiments. In the depicted stage of manufacture, polyimide cellular matrix 603 has been trimmed to fit the size of the underlying section 604. The size and shape of the cells comprising cellular matrix 603 are visible. In some embodiments, the cells may be between 0.25" and 1" across. Also visible are section walls 605, comprising aluminum foil, which are configured to prevent outflow of fumed silica at the edges of a section.

Figure 6C:
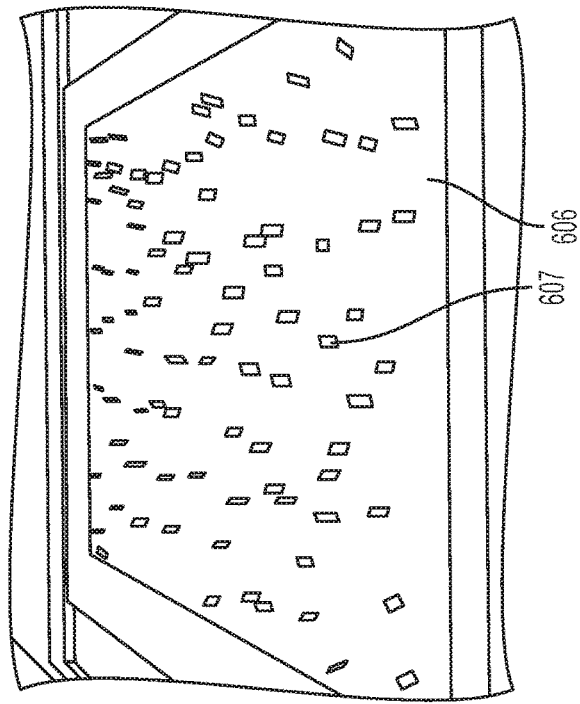

FIG. 6C depicts a third stage of manufacture of a thermally-insulating blanket in accordance with some embodiments. In the depicted stage of manufacture, fumed silica 606 has been poured atop the insulating blanket section, filling and covering the cellular matrix. Tabs such as tab 607 have been previously attached to the sidewalls of the cellular matrix (not shown), and are configured to be adhered to a top sheet (not shown), which covers the depicted section, to reduce or prevent delamination. In some embodiments, the cellular matrix may be built pre-bonded to the face sheet.

Figure 6D:
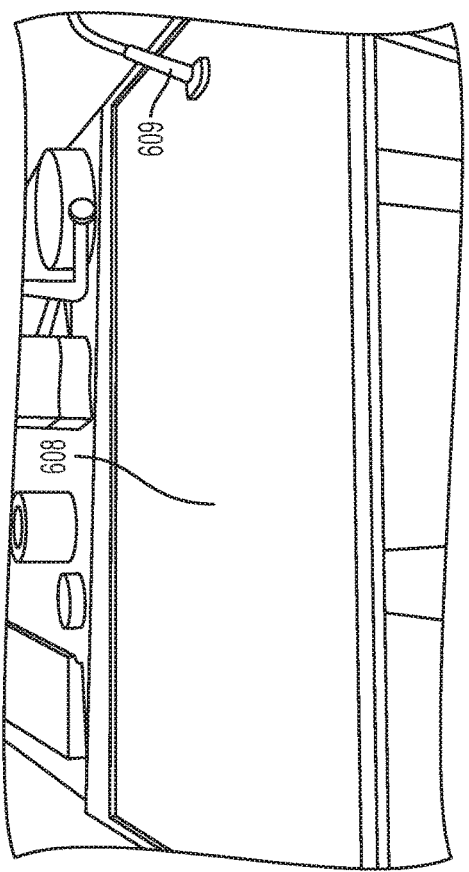

FIG. 6D depicts a fourth stage of manufacture of a thermally-insulating blanket in accordance with some embodiments. In the depicted stage of manufacture, blanket section 608 is placed inside an airtight vacuum bag. A top layer is placed on the panel with a layer of adhesive, to bond the top layer to the cellular matrix. Vacuum 609 is then used to vacuum out the air in the bag, and the blanket section is then heated in an autoclave to cure the adhesive.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, Kapton™ or other polyimides may be used to provide rigidity or structural support. As another example, the above-described embodiments may be implemented in a rigid or semi-rigid panel.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. In practice, any of the features in any of the above-mentioned alternative embodiments could be combined with any other feature to provide any desired combination of thermal insulation properties.

Also, the invention may be utilized in a suitable method, of which examples are discussed above. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A thermal insulation material, comprising:
   a first insulation layer having a cellular structure, wherein cells of the cellular structure comprise an inorganic insulator in a powder form; and
   a second insulation layer comprising inorganic fibers,
   wherein a thickness of the second insulation layer is greater than a thickness of the first insulation layer.

2. The thermal insulation material of claim 1, wherein the thickness of the second insulation layer is at least twice the thickness of the first insulation layer.

3. The thermal insulation material of claim 1, wherein the cellular structure comprises polyimide and/or polyether ether ketone (PEEK).

4. The thermal insulation material of claim 1, wherein the inorganic insulator is fumed silica.

5. The thermal insulation material of claim 1, wherein the powder form is microporous and/or nanoporous.

6. The thermal insulation material of claim 1, further comprising a reflector layer between the first insulation layer and the second insulation layer.

7. The thermal insulation material of claim 1, wherein the inorganic fibers include a mineral wool.

8. The thermal insulation material of claim 1, wherein the thickness of the first insulation layer is less than 1".

9. The thermal insulation material of claim 1, wherein a thickness of the thermal insulation material is less than 2".

10. The thermal insulation material of claim 1, further comprising a third insulator having a cellular structure, wherein a cell size of the cellular structure of the third insulator is different from a cell size of the cellular structure of the first insulator.

11. The thermal insulation material of claim 10, wherein the third insulator is polyimide foam.

12. The thermal insulation material of claim 1, further comprising a layer comprising woven fiberglass and/or woven quartz.

13. A fire protection thermal insulation system comprising:
    a first insulation layer having a cellular structure, wherein cells of the cellular structure comprise an inorganic insulator in a powder form, the first insulation layer on a fire facing side of the thermal insulation system; and
    a second insulation layer comprising inorganic fibers, the second insulation layer on a non-fire facing side of the thermal insulation system,
    wherein a thickness of the second insulation layer is greater than a thickness of the first insulation layer.

14. The fire protection thermal insulation system of claim 13, wherein the inorganic insulator is fumed silica and the inorganic fibers include a mineral wool.

15. The fire protection thermal insulation system of claim 13, wherein the thickness of the first insulation layer is less than 1".

16. The fire protection thermal insulation system of claim 13, further comprising a layer comprising woven fiberglass and/or woven quartz.

17. The fire protection thermal insulation system of claim 13, wherein the inorganic fibers include a mineral wool.

\* \* \* \* \*